US006705773B2

(12) United States Patent
Fix

(10) Patent No.: US 6,705,773 B2
(45) Date of Patent: Mar. 16, 2004

(54) THREE VERTICAL AXIS OMNI-BOOM CAMERA CRANE WITH ROTATIONAL CONSISTENCY

(76) Inventor: Warren S. Fix, 15 Pine Point Dr., Bridgeport, CT (US) 06606

( * ) Notice: Subject to any disclaimer, the term of this patent is extended or adjusted under 35 U.S.C. 154(b) by 0 days.

(21) Appl. No.: 10/144,891

(22) Filed: May 13, 2002

(65) Prior Publication Data
US 2002/0168188 A1 Nov. 14, 2002

Related U.S. Application Data
(60) Provisional application No. 60/290,731, filed on May 14, 2001.

(51) Int. Cl.[7] ................................................ G03B 17/00
(52) U.S. Cl. .................. 396/419; 396/428; 248/123.11; 352/243; 280/47.11; 280/183.1
(58) Field of Search .................. 396/419–421, 396/428; 352/53, 243; 248/123.11, 177.1; 280/99, 103, 400

(56) References Cited

U.S. PATENT DOCUMENTS

| 3,103,257 | A | | 9/1963 | Richards |
| 3,820,134 | A | | 6/1974 | Wilton et al. |
| 3,891,301 | A | * | 6/1975 | Heller .......................... 396/428 |
| 4,344,595 | A | * | 8/1982 | Heller et al. ................. 248/542 |
| 4,657,220 | A | | 4/1987 | Lindsay |
| 4,685,649 | A | * | 8/1987 | McKay ........................ 248/594 |
| 4,849,778 | A | | 7/1989 | Samuelson |
| 5,033,705 | A | | 7/1991 | Reagan |
| 5,177,516 | A | | 1/1993 | Fitz et al. |
| 5,218,876 | A | | 6/1993 | Lindsay |
| 5,435,515 | A | | 7/1995 | DiGiulio et al. |
| 5,531,412 | A | | 7/1996 | Ho |
| 5,781,814 | A | | 7/1998 | Chapman |
| 5,940,645 | A | | 8/1999 | Bonin |
| 6,186,023 | B1 | * | 2/2001 | Nakamura et al. ....... 248/123.2 |
| 6,217,236 | B1 | | 4/2001 | Chapman |
| 6,354,750 | B1 | | 3/2002 | Romanoff |
| 6,450,706 | B1 | * | 9/2002 | Chapman .................... 396/428 |

OTHER PUBLICATIONS

American Cinematographer, Nov. 1995 vol. 76, No. 11, p. 11 Weaver/Steadman new model #1036 (advertisement) published by ASC Holding Corp. of Hollywood, CA.

* cited by examiner

Primary Examiner—D. Rutledge
(74) Attorney, Agent, or Firm—Ware Fressola Van Der Sluys & Adolphson LLP

(57) ABSTRACT

A crane for lifting, moving, and positioning a camera or other object. The Omni-Boom crane configuration allows much more unrestricted movement than a conventional single boom design, using one vertical axis for azimuth pivoting movement, and one horizontal axis for elevation movement. The Omni-Boom has two additional upright axes perpendicular to the main boom, one for a distal camera boom, and one for a proximal counterweight boom, allowing more horizontal freedom while maintaining the balance of the crane. Throughout this increased range of motion, the support of the camera remains level. The support can also maintain a constant camera aim azimuth rotational relationship with the base of the crane. The camera's aim azimuth relative to the fixed base remains constant during boom movement. With this constant aim azimuth, combined with greater freedom of horizontal motion, this crane offers unique possibilities for camera movement and control.

14 Claims, 10 Drawing Sheets

THREE VERTICAL AXIS OMNI-BOOM CAMERA CRANE WITH ROTATIONAL CONSISTENCY

RELATED APPLICATION

This application claims priority to provisional application Ser. No. 60/290,731, filed May 14, 2001.

TECHNICAL FIELD

The present invention relates generally to camera booms and support cranes, and more particularly to a unique mechanical configuration that provides unique freedom and control for use in supporting a motion picture or video camera or the like in a substantially "weightless" counter-balanced manner.

BACKGROUND OF THE INVENTION

Camera support platforms for use in the motion picture industry are well known in the prior art. Such booms or cranes enable the camera operator to move in various directions within a restricted area to facilitate various camera angles and shots.

PRIOR ART

These devices typically include some form of jib arm mounted to a movable dolly. While these prior art cranes have proved generally useful, often they do not enable the camera to move in a straight manner without also moving the dolly. Moreover, the jib arm is normally supported in such way as to limit the overall freedom of movement, especially adjacent the dolly.

Examples of the single boom design represented in FIG. 1 are shown in U.S. Pat. Nos. 5,781,814; 6,217,236B1; and 5,940,645. U.S. Pat. Nos. 5,781,814 and 6,217,236B1 are refined designs of the single boom with integrated leveling assemblies to provide greater strength and easier set up and tear down. U.S. Pat. No. 5,940,645 is a simplified single boom representation with an added manual control for up and down tilting of the camera.

U.S. Pat. No. 5,531,412 shows a design allowing for various camera distance from the base of the crane. This is achieved by the use of two additional horizontal axes, one for the camera arm and one for the counterweight arm. To move the camera in a straight line, raising and/or lowering of the main boom is required. To bring the camera close to the base of the crane, more height is required, similar to single boom designs. Each time the crane is rotated on its single vertical axis, the aim azimuth of the camera changes.

The Weaver Steadman "8 Ft. Multi-Axis Jib Arm" that is advertised in *The American Cinematographer Magazine* November 1995 issue on page 11 maintains a level mounting for one extra vertical axis.

Around this constantly vertical axis rotates an arm that carries the camera at one end and a counter-weight for the camera at the other end. This adds weight to the distal end of the crane and therefore to the proximal main counter-weight of the crane. The camera can only be raised or lowered to the extent of the main boom. The aim azimuth of the camera changes each time the main boom or the camera arm is moved.

It is therefore desirable to provide a camera support platform that overcomes these and other problems associated with the prior art.

BRIEF SUMMARY OF THE INVENTION

It is an object of the present invention to provide a camera suspension apparatus that isolates the weight of the camera from that of the camera operator and provides total freedom of movement within the spatial area adjacent the apparatus, with the operator either at the camera itself or at the back of the crane, for full freedom of camera elevation.

It is another object of the present invention to provide a camera suspension apparatus that has a stable base for support that allows the operator to move the camera in a straight line without moving the support.

It is yet another object of the present invention to provide a camera suspension apparatus that, if the base remains stationary, maintains a constant parallel aim azimuth direction at the camera support. This constant parallel aim azimuth can be maintained if desired throughout all possible positions and movements of the invention.

It is still another object of the invention to provide a camera suspension apparatus which is portable and easy to set-up and use, and which is formed of lightweight yet rigid materials for increased stability and reduced maintenance.

It is yet another object to provide a suspension apparatus having a plurality of arms which pivot relative to each other upon pivot assemblies that also serve as structural supports. These and other objects of the invention are provided in a suspension apparatus that enables an operator to make fluid camera movements without himself holding up the weight of the camera.

The invention accordingly comprises the features of construction, combinations of elements, and arrangements of parts which will be exemplified in the construction hereinafter set forth, and the scope of the invention will be indicated in the claims.

THE DRAWINGS

For a fuller understanding of the nature and objects of the invention, reference should be made to the following detailed description taken in connection with the accompanying drawings, in which.

DESCRIPTION OF THE PREFERRED EMBODIMENTS

Figure 1:
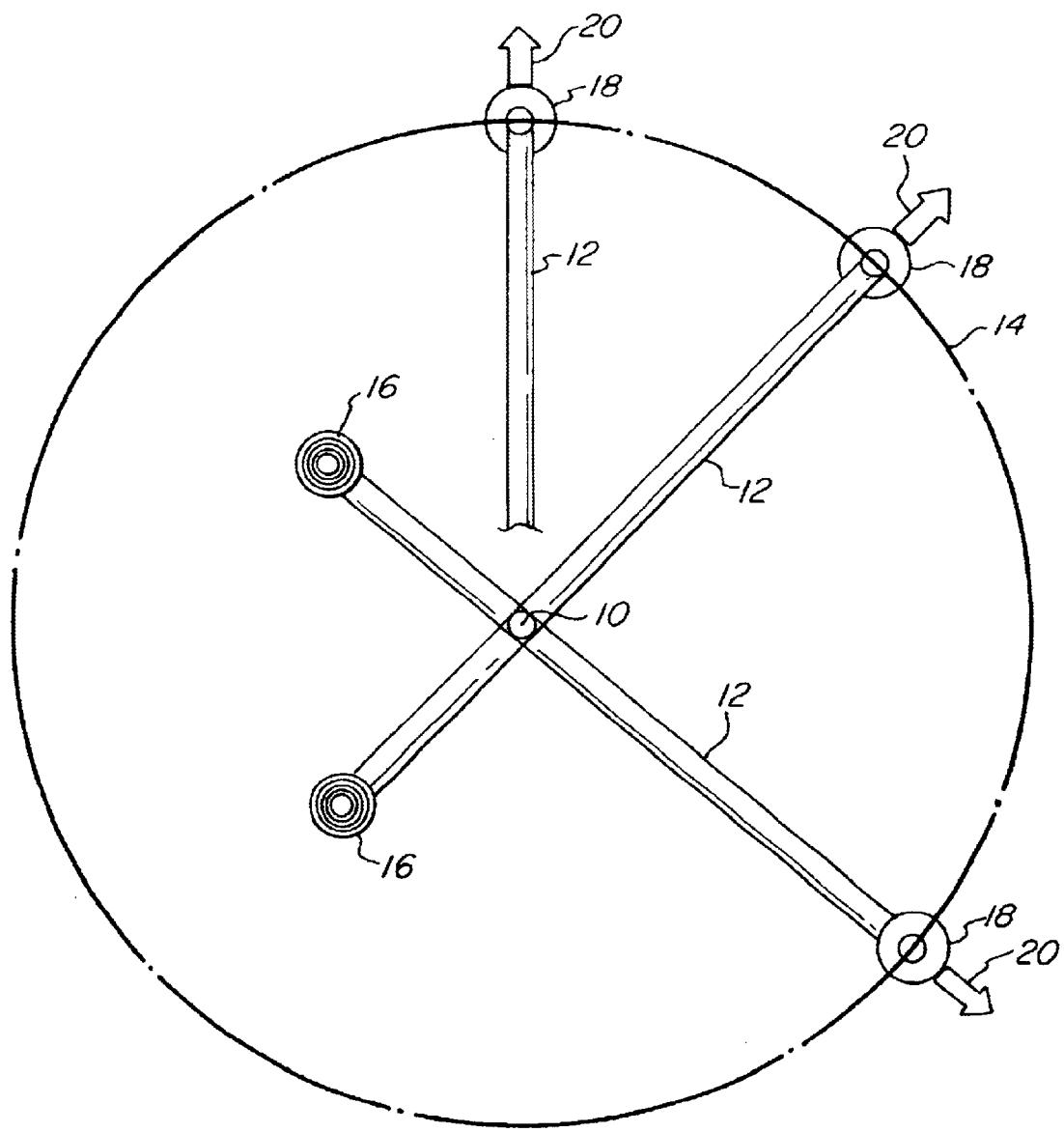
FIG. 1 is a top plan diagram of a prior art single boom crane, pivoted to different positions.
Figure 2:
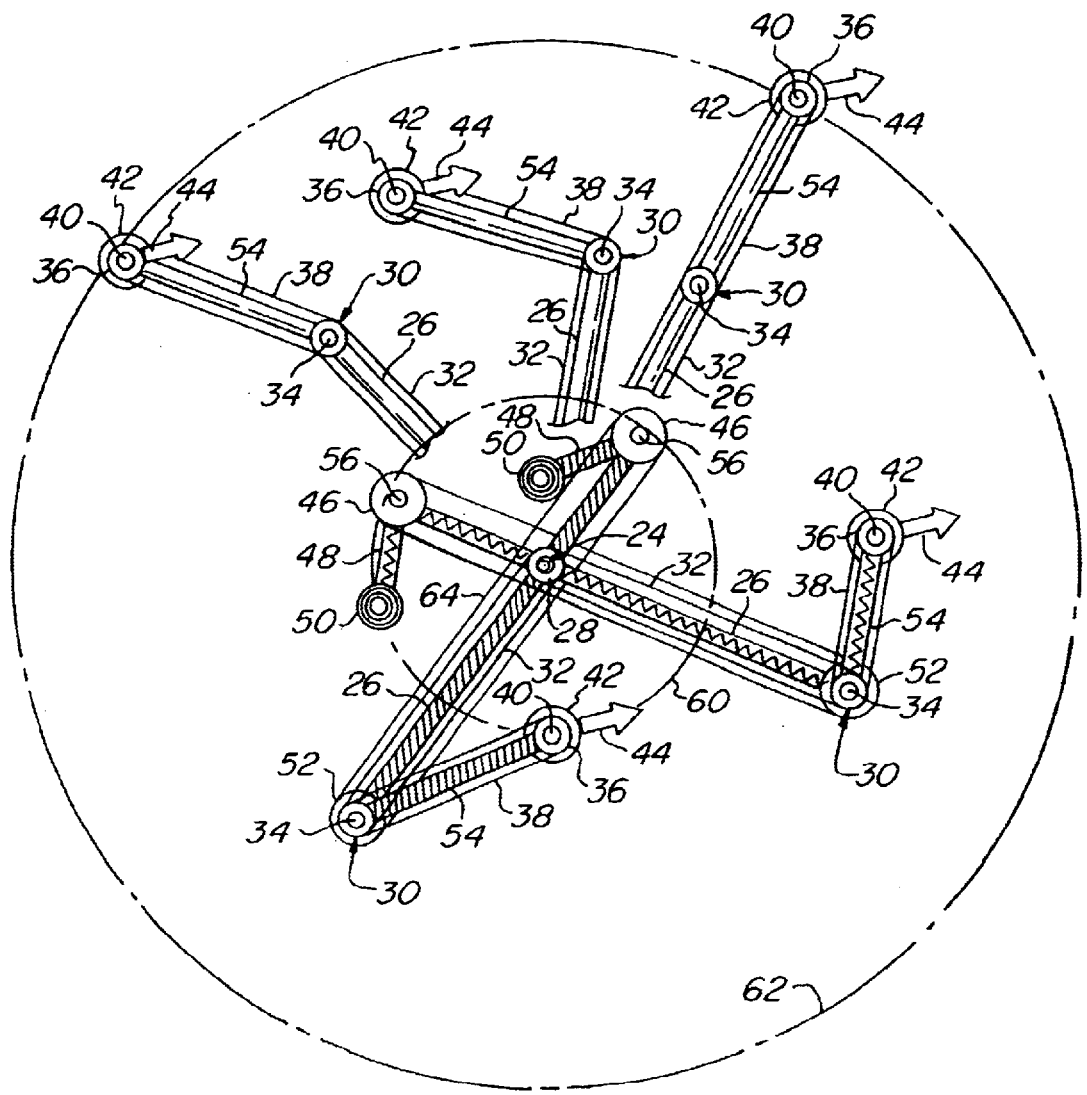
FIG. 2 is a similar top plan diagram of an Omni-Boom Crane, pivoted to several different positions.

The mechanical advantages of the extra perpendicular pivot axis and rotational consistency are represented in FIGS. 1 and 2. FIGS. 1 and 2 are simplified to represent only movement and balance. FIGS. 1 and 2 show movement on only the horizontal plane. FIG. 1 is a single boom crane configuration. Point 10 represents a vertical axis or swivel point that is supported by the base of the crane. Boom 12 rotates around point 10. A counterweight 16 is at one end of the boom and a camera support 18 is at the other end. Point 10 is at the center of a horizontal axis on which a crane is balanced. Therefore, point 10 is the balance point or fulcrum of the simplified crane of FIG. 1. With the base of such a crane stationary, the horizontal movement of the camera is limited to a circle 14 determined by the length of the boom 12. The camera support to counterweight relationship is constant. The aim azimuth 20 in which the support is pointed, changes constantly as the boom 12 is rotated. A remote camera control head must be used between the support 18 and a camera in order to control the horizontal aim azimuth of the camera. This aim azimuth can be difficult to control and/or maintain when the boom 12 is being rotated.

Figure 3:
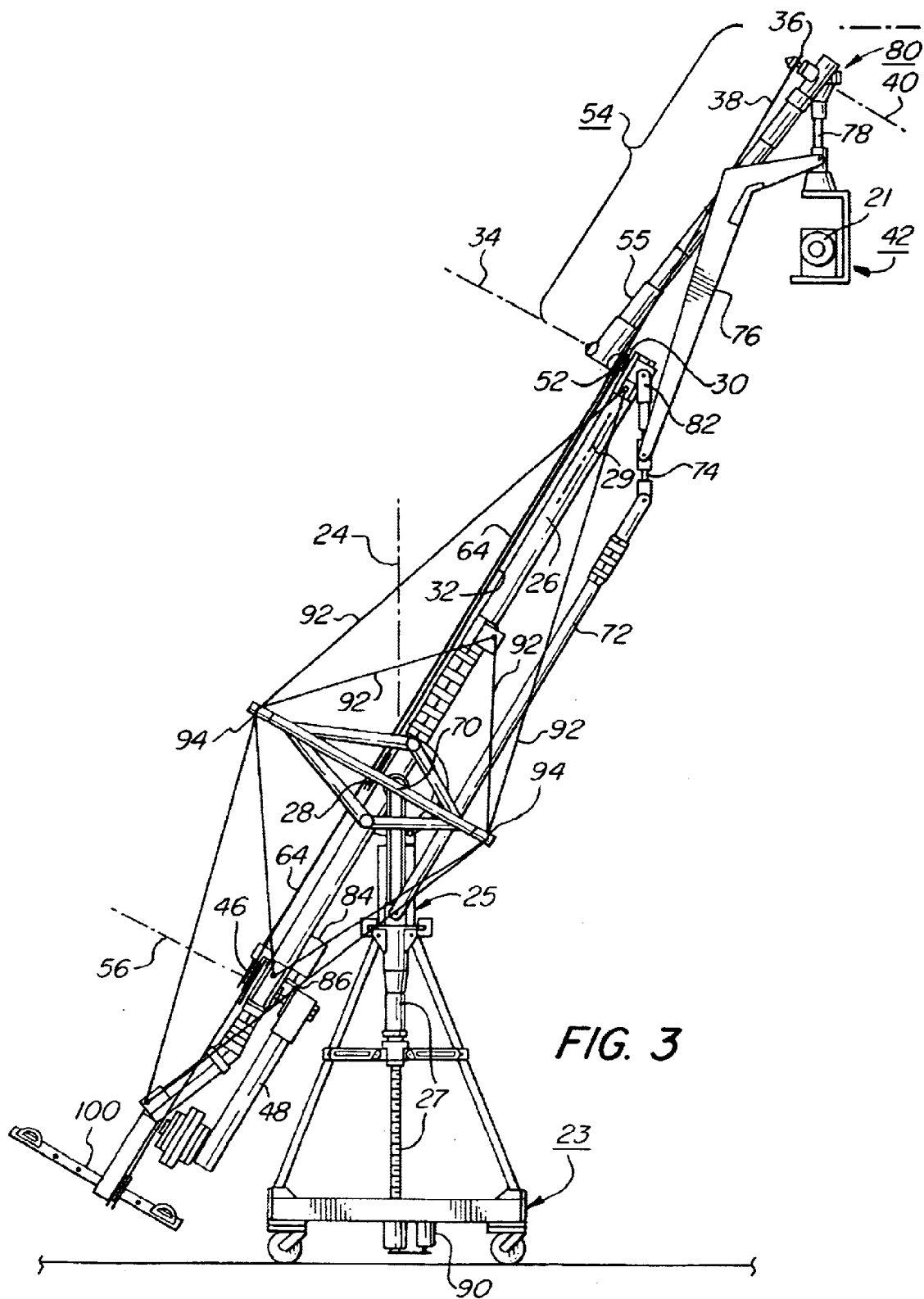
FIG. 3 is a schematic side elevation diagram of an Omni-Boom Crane elevated above a horizontal position.
Figure 4:
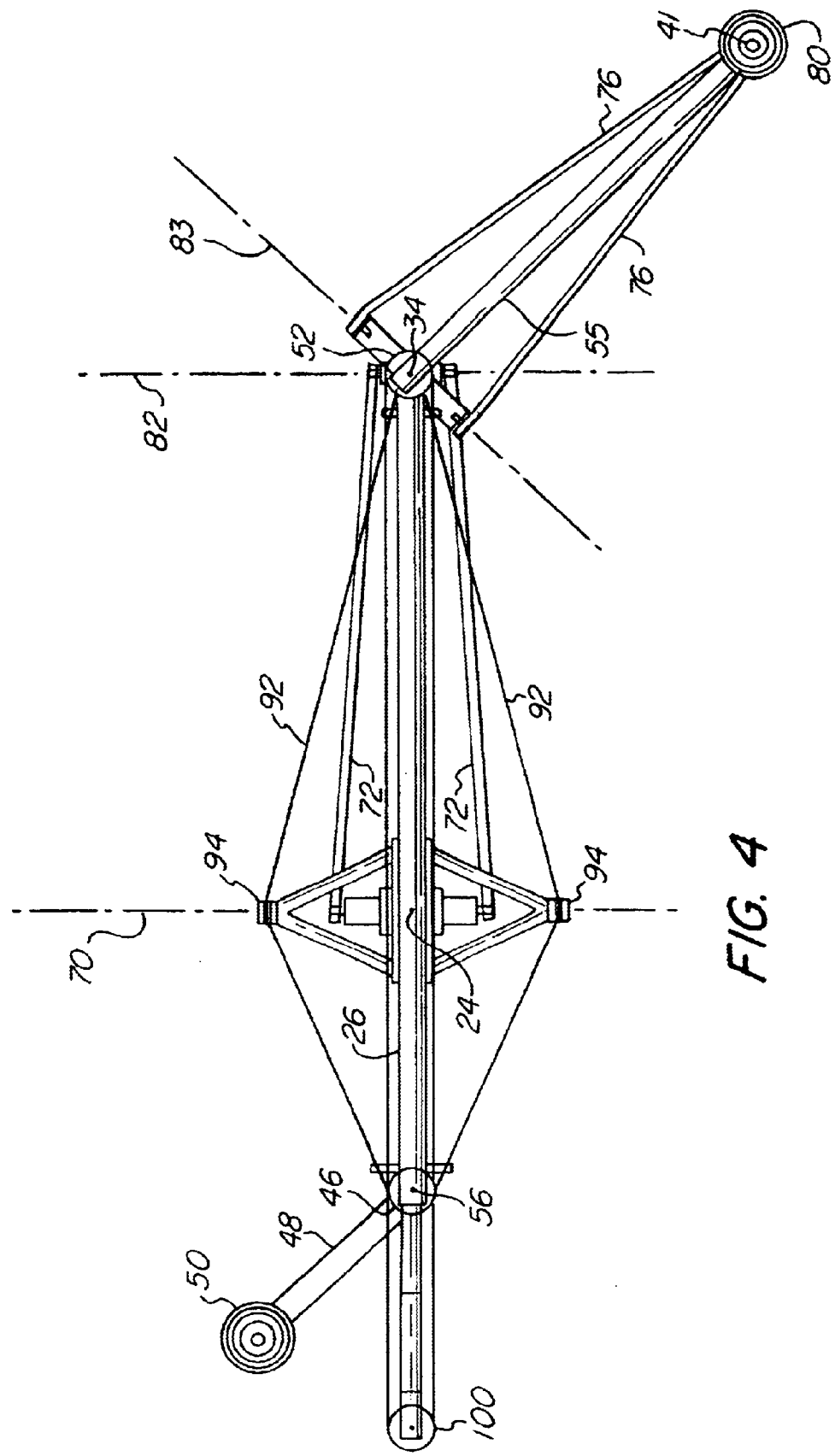
FIG. 4 is a top plan diagram of the boom-positioning components of the Omni-Boom Crane of FIG. 3, with various structural features omitted for clarity.

FIGS. 2, 3 and 4 are representations of the Omni-Boom, a three boom configuration with rotational linkage between the base and camera support.

The three booms are a main boom 26, a camera boom assembly 54 and a counterweight boom 48. Camera boom assembly 54 is pivotally supported at the distal end of boom 26, pivoting about an upright axis 34 perpendicular to boom 26. Counterweight boom 48 similarly pivots about perpendicular axis 56 at the proximal end of boom 26, as shown in FIGS. 2 and 3.

Assembly 25 is the boom support assembly mounted on the base 23 of the crane, which preferably rests on lockable wheels and may thus be clamped in a fixed position. Assembly 25 supports the main boom 26 at horizontal axis 70 on which the crane is balanced, therefore horizontal axis 70 is the fulcrum or balance point. Assembly 25 surrounds a vertically extendible shaft assembly 27 that is mounted on the base 23 of the crane. If the base of the crane is stationary, the shaft assembly 27 within assembly 25 remains stationary, regardless of the rotation of main boom 26 around base assembly 23.

A timing belt pulley 28 is attached to the main boom 26 just above assembly 25 by a shaft that is held in a linear-rotary bearing. This shaft is connected to a double universal joint that is centered on axes 70, 24 and the central axis 29 of main boom 26. The other end of this double universal joint is connected to the shaft 27 surmounting the base 23 of the crane. The linear rotary bearing is used to accommodate the linear difference between a single axis bend (axis 70) and a double axis bend (the double universal joint). Fulcrum timing belt pulley 28 is connected to one of two timing belt pulleys 30 at the distal end of boom 26 by a timing belt 32. Timing belt pulleys 30 are two ganged timing belt pulleys of the same diameter, connected one directly on top of the other, with bearings allowing them to rotate together on a distal axis 34, perpendicular to boom 26. A timing belt pulley 36 at the distal end of camera boom assembly 54 is connected by a timing belt 38 to the other of the timing belt pulleys 30.

Figure 9:
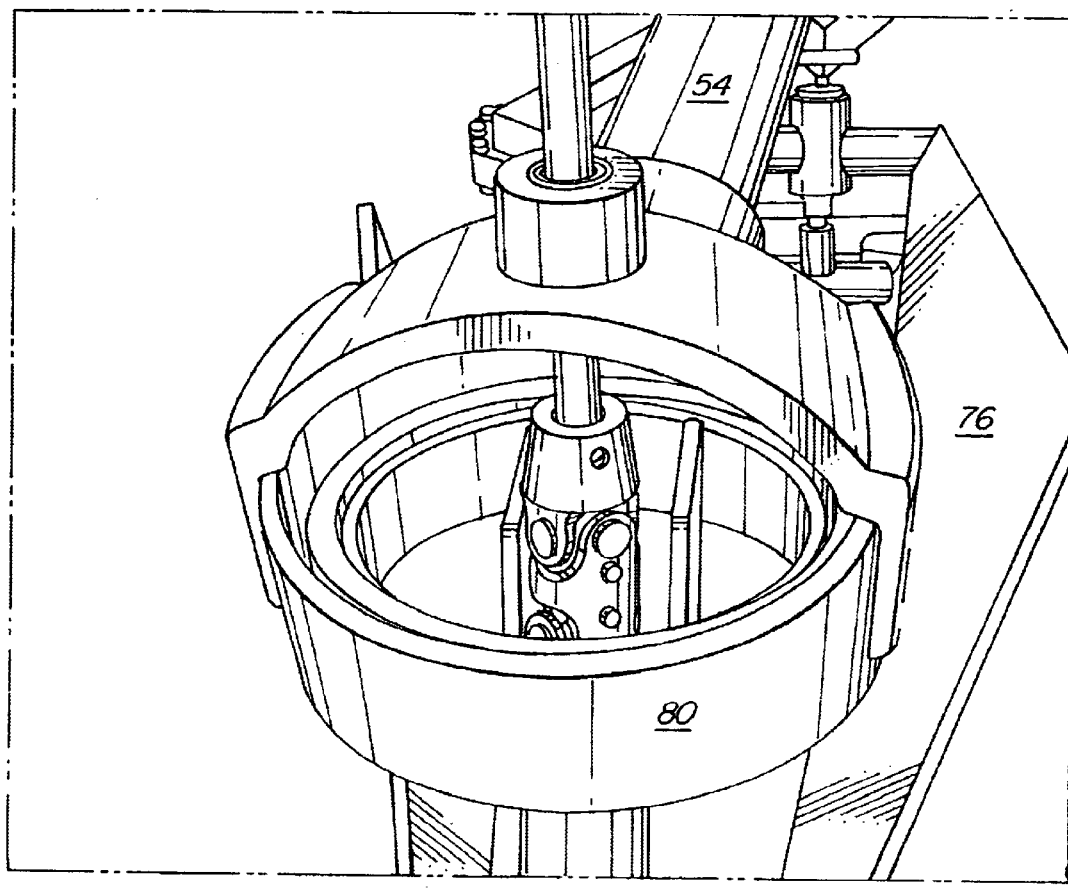
FIG. 9 is a fragmentary enlarged front-top perspective view of the gimbal mount at the distal end of the camera supporting boom from which a vertical post depends to carry the camera mount.
Figure 10:
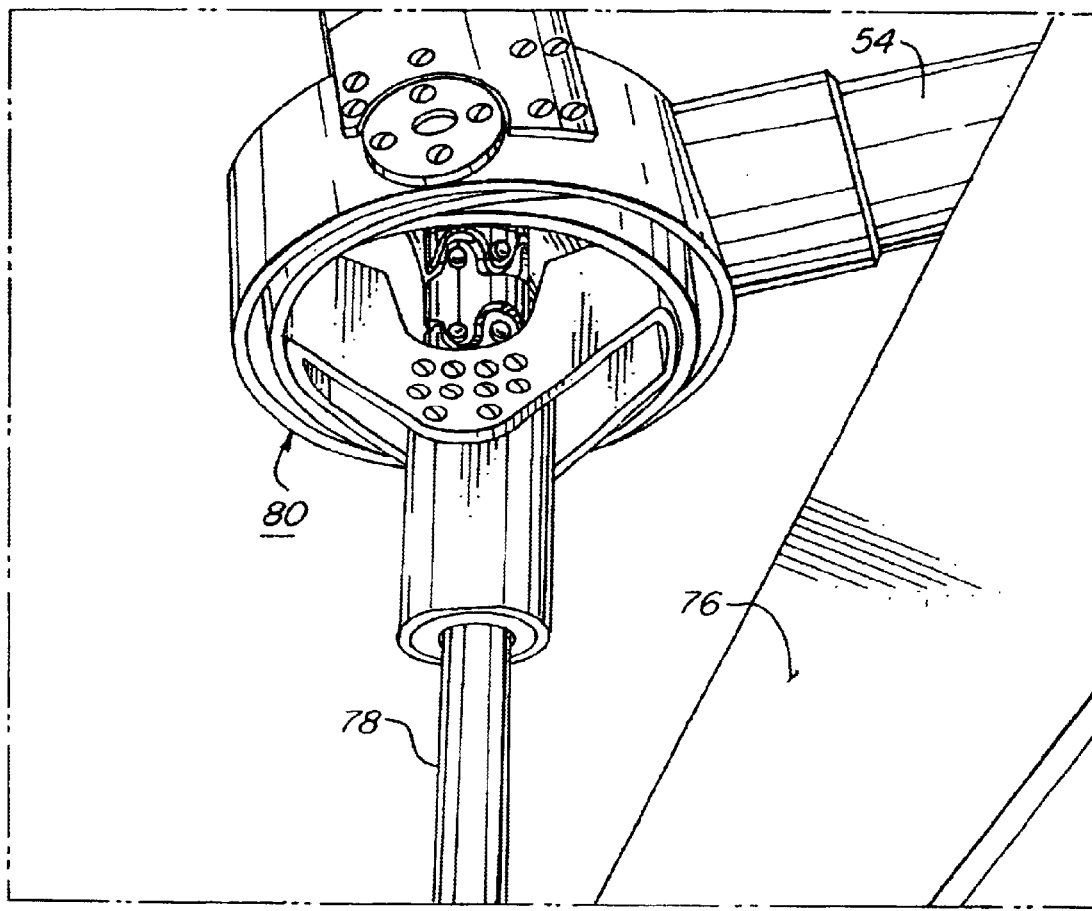
FIG. 10 is a fragmentary enlarged side-bottom view of the same gimbal mount and depending vertical post.

Timing belt pulley 36 rotates about a third perpendicular axis 40, and is connected to camera support 42, through swivel point 41 (FIG. 4) by a linear-rotary bearing double universal joint assembly similar to the one aforementioned, combined with a gimbal assembly 80 (FIGS. 3, 9 and 10) from which a second vertical post 78 is suspended, parallel to a first vertical post 74 suspended from the distal end of main boom 26. Thus, a rotational, or parallel aim azimuth relationship is established between timing belt pulley 28 and camera support 42. Arrow 44 represents one possible direction and assumes that pulley 28 will remain stationary.

Camera support 42 is thus supported by a camera support boom 55, a component of camera boom assembly 54.

Two timing belt pulleys 46 and the boom 48, carrying a counterweight 50, are supported by bearings in the proximal end of boom 26, for rotation around perpendicular pivot axis 56. Timing belt pulley 52, boom 54, and camera support 42 are supported by bearings at the distal end of boom 26, for movement around first upstanding perpendicular axis 34. A wide timing belt 64 connects distal timing belt pulley 52 to proximal timing belt pulley 46. When camera support 42 is moved, belt 64 and its timing pulleys move counterweight 50 in the opposing direction, and visa-versa. Therefore the camera support to counterweight relationship remains constant, balanced about fulcrum 70. On a horizontal plane, the possible placement and movement of the camera support is represented by the space between circle 60 and circle 62 in FIG. 2. Mechanical brakes are used at each vertical and horizontal axis of the configuration; allowing the Omni Boom crane to be 'frozen' in any position.

A first vertical post 74 depends from the distal end of main boom 26, connected for pivoting movement about a transverse horizontal axis 82 (FIGS. 3 and 4). Connector spacer arm means 72 pivoted on a central horizontal axis on boom support assembly 25 and on a distal transverse horizontal axis at the lower end of post 74 parallel to axis 82 maintains post 74 vertical.

Another smaller level maintaining arm means 76 is rotationally hinged at both ends between vertical post 74 and the similar depending camera support vertical post 78. From above, as shown in FIG. 4, both level maintaining booms 72 and 76 are preferably triangular in configuration. The rear ends of the pair of connector spacer arms 72 are mounted further apart at the boom support assembly 25 and closer together at the vertical post 74. The rear ends of the pair of level maintaining arms 76 are also mounted further apart pivoted on an independent horizontal axis 83 for greater lateral strength at the vertical post 74 and closer together at the vertical camera post 78.

Leveling boom 76 is angled to provide space for the camera when the boom crane is raised or lowered to its maximum angle of 60 degrees. Because of the angular difference between the rotations of the camera boom assembly 54 and the leveling boom 76, a gimbal mount 80 is used at the axis 40 end of boom 54 to suspend post 78. This gimbal mount allows for omni directional hanging of post 78 while maintaining the height of this post.

As shown in FIG. 3, two parallelograms maintain depending posts 74 and 78 vertical. Boom 26, arm means 72, support assembly 25 and post 74 form the first parallelogram, and post 74, post 78, leveling arm means 76 and camera support boom 55 form the second parallelogram, in effect.

Geometrically speaking, the center point or intersection of axes of the gimbal mount 80, axis 82, the main transverse horizontal axis 70 at vertical axis 24 and the center of the counter weight 50 are always on the same plane parallel to axis 29 of boom 26. Rotation of booms 54 and 48 can be powered by motor 84 that drives belt 64 through gears 86. A manual rotation of the booms 54 and 48 by a bearing mounted timing belt pulley and handle assembly 100 is possible, and the camera may be controlled directly at camera mount 42. A rotational relationship is established between the camera and the base of the crane. That is, while the main boom 26 and the extension boom 54 are rotated on their axes, independently or simultaneously, the camera head mount will stay aimed in the same parallel-aim azimuth direction (FIG. 2). This is achieved by mechanical connections, consisting of a double universal joint (not shown) within the gimbal mount 80, a shaft held within a linear rotary bearing, timing belt pulley 36, timing belt 38, and a similar linear rotary bearing double universal joint assembly that runs through the center of axis 70 down the internal shaft 27 to the non rotating base 23 of the crane, in its fixed position mode.

In addition to a full base to camera rotational relationship, two other alternative rotational relationships can be separately established. By removing timing belt 32, and locking the pulleys 30 to main boom 26, a main boom to camera rotational relationship is achieved with no relation to base 23. By removing timing belt 32, and locking the pulleys 30 to camera support boom 55, a non-rotational relationship between camera and all booms is established. To rotate the camera in relation to camera support boom 55, a remote camera control head must be used between the camera mount 42 and camera 21.

Figure 5:
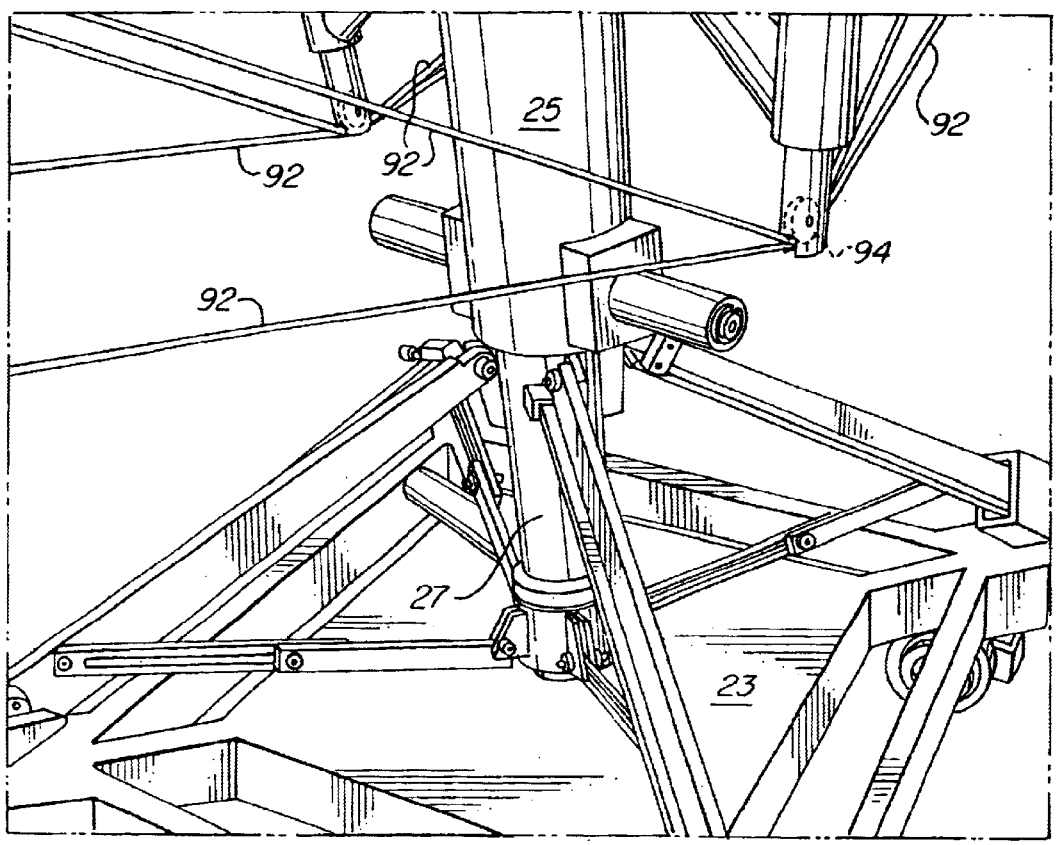
FIG. 5 is a partial perspective view of the Omni-Boom of this invention showing its base and boom support assembly.
Figure 6:
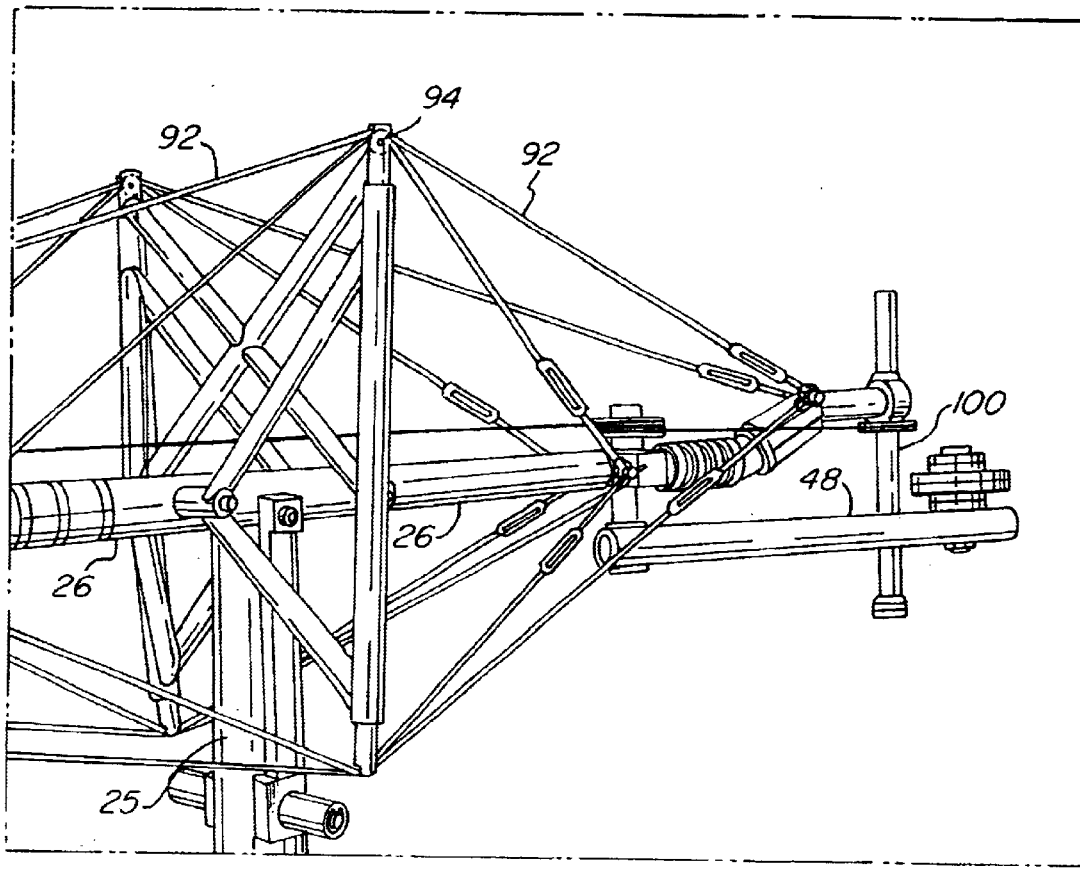
FIG. 6 is a partial side perspective view of the proximal counterweight end of the same device.
Figure 7:
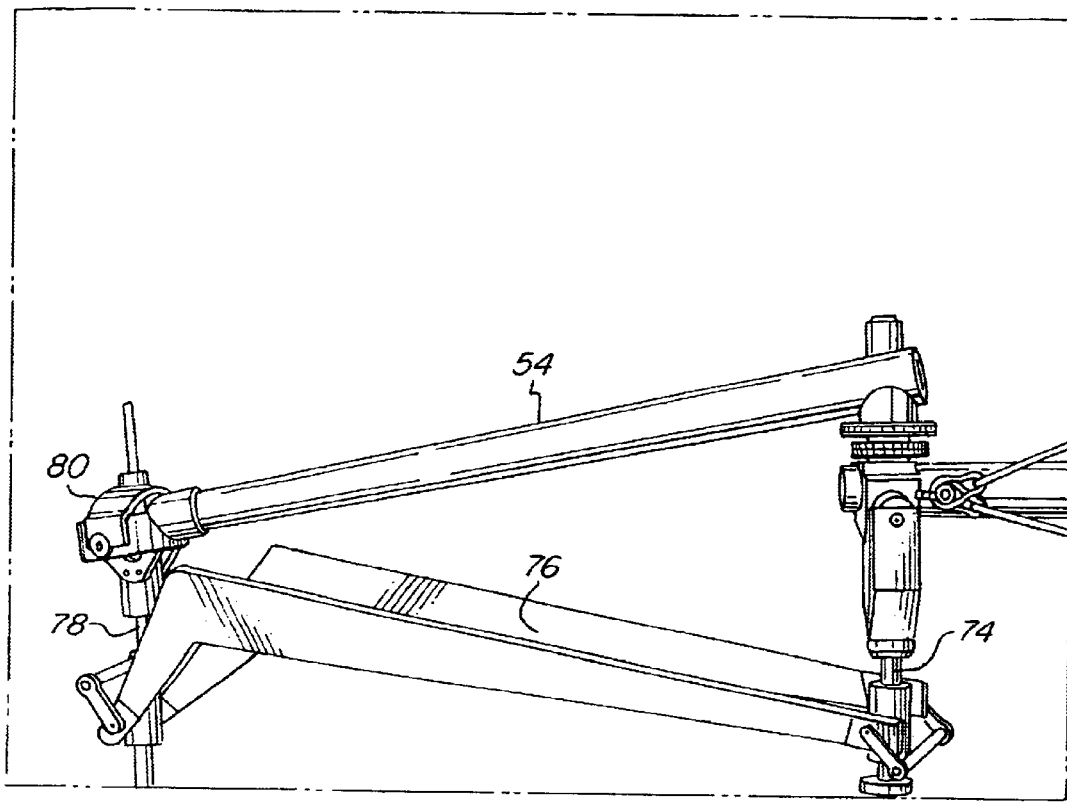
FIG. 7 is a partial side view of the distal camera supporting boom assembly of the device.
Figure 8:
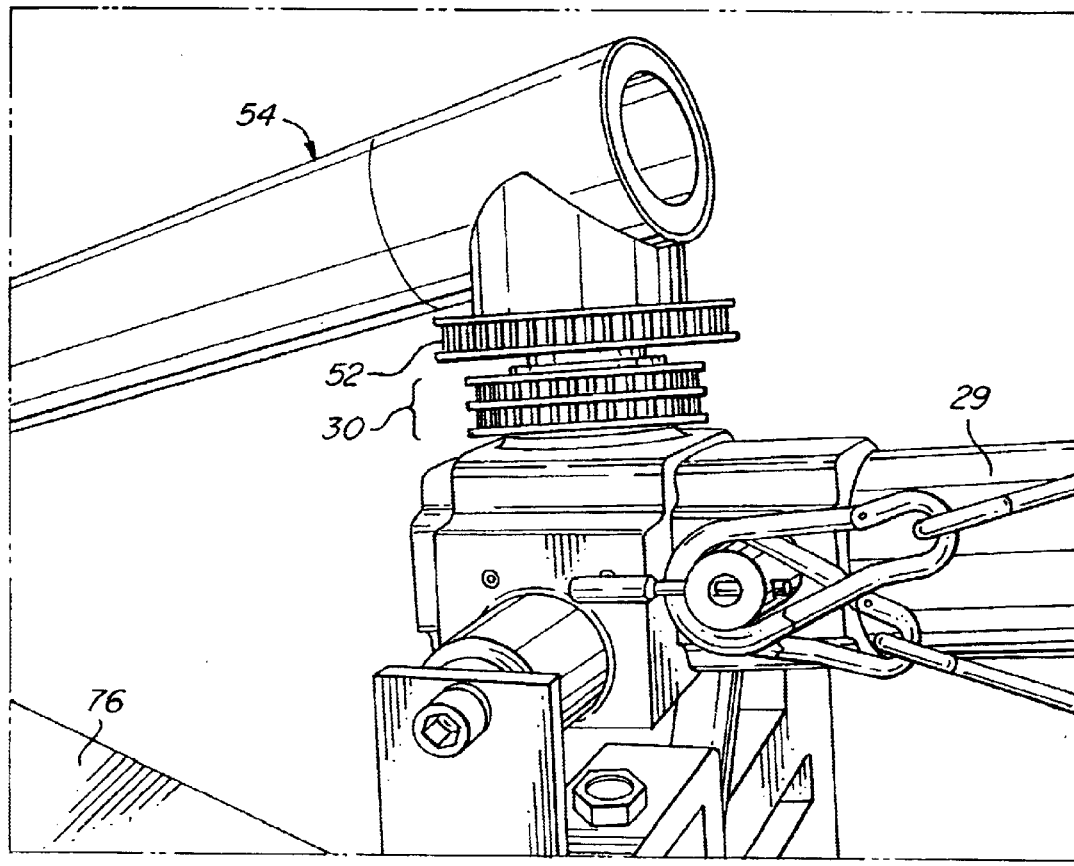
FIG. 8 is a fragmentary enlarged side view of the pivot assembly joining the distal camera supporting boom to the main boom.

This design requires a strong main boom 26. To reinforce this boom, cable 92 is added and is tightened through a system using locking pulleys 94, mounted at the outer ends of compression spreader struts to produce stiffening diamond stay assemblies, shown in FIGS. 3, 5 and 6. With all booms supported, all pulleys 94 are unlocked, cables 92 are tightened preferably with turnbuckles or other establishing means until all cables have equal and optimum tension, the pulleys 94 are then all locked in place to maintain optimum tension in all cables 92 while the crane is used.

This Omni-Boom crane has a vertically extendable upstanding column 27 surmounting base 23 preferably incorporating a ball screw and four extension locking legs for strength to allow more possibilities of camera placement. Control of this crane is from a handle assembly 100 mounted on a handle boom that angles above where the counterweight 50 and its boom 48 swing as the camera extension boom 54 is rotated from side to side.

The systems shown to drive the extra booms 54 and 48 and to control the rotation of the camera consist of timing belts and timing belt pulleys. However, gear and driveshaft systems will be less bulky and may be less affected by bending of the booms. Gear and drive shaft systems or other mechanical means may be used to drive the camera to base rotational relationship. All axes of the crane can be powered by electric motors, and therefore, control can be computer aided and programmed, allowing complete command of camera movement. Manual control is also possible from the camera itself, including rotation of the extra booms.

I believe the geometry of the mechanical connections is unique, employing three vertical axes 24, 74 and 78 and three upright axes 34, 40 and 56 perpendicular to axis 29 of the main boom 26 and camera boom assembly 54 are aligned. This geometry is used to maintain camera head mount level and provide rotational control in this design. Also unique is the locking pulley cable tensioning system for rigidifying and stiffening the lightweight structure. Unique software can be designed to provide computer control of a fully powered model of similar design.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A camera boom maneuvering assembly for carrying a camera maintained substantially weightless on a level mount movable through a range of elevations above and below a horizontal plane and a range of azimuths while controlling the camera's aim azimuth, comprising in combination:

A base (23) having a vertically extendable upstanding column (27) thereon, a boom support assembly (25) mounted on said column, and having a vertical axis (24), an elongated main boom (26) having an internal central axis (29), pivotally mounted atop said vertically extendable upstanding column (27) for angular elevation through a range of vertical angles above and below horizontal and having a rear or proximal end and a front or distal end, said main boom (26) also being mounted for rotation relative to said base through a range of azimuth angles, a camera boom assembly (54) including a camera support boom (55) having a rear end movably mounted at the distal end of the main boom for angular pivoting movement about a first upstanding axis (34) perpendicular to the central axis of the main boom near the distal end thereof, a first vertical post (74) depending from said main boom distal end at a first transverse horizontal pivoting axis (82) intersecting said first upstanding axis (34), rigid connector spacer means (72) with a proximal end pivotally joined to said boom support assembly (25) for movement about a second transverse horizontal pivot axis, and a distal end pivotally joined to a lower end of said first depending vertical post (74) for movement about a third transverse horizontal pivot axis, said connector spacer means (72), boom support assembly (25), main boom (26) and first depending vertical post (74) together forming a first parallelogram, said camera support boom also having a forward end including a gimbal assembly (80) defining and encircling a second upstanding axis (40) perpendicular to the central axis of the main boom, said camera support boom's gimbal assembly supporting an upper end of a second depending vertical post (78) having a central axis passing through said gimbal assembly and a lower end carrying a camera mount, said second depending vertical post (78) being mounted in said gimbal assembly for pivoting azimuth rotation about said second post's vertical axis passing through said gimbal assembly, said camera boom assembly also including leveling arm means (76) pivotally mounted on said first vertical post (74) at a horizontal pivot axis passing through said first vertical post, and extending toward said second vertical post, said leveling arm means having a forward end pivotally connected to said second vertical post (78) for movement about a third horizontal axis passing through said second vertical post at a level above said camera mount, the two depending vertical posts, the camera support boom and the leveling arm means together forming a second parallelogram, a counterweight boom (48) having a forward end mounted near the proximal end of the main boom for pivotal movement around a third axis (56) perpendicular to the central axis (29) of the main boom (26) and having a rear end carrying a selectable plurality of counterweights, a control arm mounted at the proximal end of the main boom connected for operational control of the camera boom assembly, and torque transmitting means mounted on the main boom and connecting the camera boom assembly and the counterweight boom (48) for angular movement in opposite directions about their individual pivot axes perpendicular to the main boom's axis (29).

2. The camera boom maneuvering assembly defined in claim 1, wherein the base (23) is provided with disengageable means for clamping the base in a selectable fixed position.

3. The camera boom maneuvering assembly defined in claim 2, wherein the torque transmitting means is connected to the camera boom assembly in a manner maintaining the aim azimuth of a camera held by said camera mount in a predetermined direction relative to the base clamped in its fixed position.

4. The camera boom maneuvering assembly defined in claim 1, wherein the torque transmitting means is connected to maintain the aim azimuth of a camera held by said camera mount in a predetermined direction relative to the axis (29) of the main boom (26) regardless of the position of the base (23).

5. The camera boom maneuvering assembly defined in claim 1, wherein the torque transmitting means is connected to maintain the camera's aim azimuth in a predetermined direction relative to the camera support boom, regardless of the position of the base and of changes in the azimuth of the main boom.

6. The camera boom maneuvering assembly defined in claim 1 wherein said torque transmitting means is disconnectable, thereby freeing a camera held by said camera mount for control by an operator regardless of the elevations and azimuths of said main boom, said camera support boom and other components of said maneuvering assembly.

7. The camera boom maneuvering assembly defined in claim 1 wherein said main boom (26) is provided with centrally located compression spreader strut means having roller pulleys positioned at locations removed from axis (29) of boom (26), with tension cables extending over each said roller pulley with proximal and distal ends anchored to the main boom at respective proximal and distal anchor points positioned at locations substantially spaced away from said spreader struts to form diamond stay assemblies for stiffening said main boom (26).

8. The assembly defined in claim 7 where each said cable is provided with a tension-adjusting turnbuckle.

9. The assembly defined in claim 7 wherein said spreader strut means includes at least two separate and independent diamond stay assemblies in different operational planes.

10. The assembly defined in claim 7 wherein each said roller pulley is clampable.

11. The camera boom maneuvering assembly defined in claim 1 wherein said torque transmitting means include endless timing belts engaged on timing belt pulleys rotatably mounted on said main boom.

12. The assembly defined in claim 11 further including a timing belt pulley rotatably mounted on said camera support boom.

13. The camera boom maneuvering assembly defined in claim 1, wherein said leveling arm means includes a pair of leveling arms flanking said first vertical post and converging to distal positions flanking said second vertical post, providing a transverse triangular configuration when viewed from above.

14. The camera boom maneuvering assembly defined in claim 1 wherein said rigid connector spacer means includes a pair of rigid connector bars flanking said boom support assembly (25) and converging to distal positions flanking said first vertical post, providing a transverse triangular configuration when viewed from above.

* * * * *